US010524136B2

(12) United States Patent
Yang et al.

(10) Patent No.: US 10,524,136 B2
(45) Date of Patent: Dec. 31, 2019

(54) APPARATUS, SYSTEM AND METHOD OF COMMUNICATING VIA A PLURALITY OF ANTENNAS

(71) Applicant: INTEL IP CORPORATION, Santa Clara, CA (US)

(72) Inventors: Ou Yang, Santa Clara, CA (US); Solomon B. Trainin, Haifa (IL); Carlos Cordeiro, Portland, OR (US); Chittabrata Ghosh, Fremont, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 235 days.

(21) Appl. No.: 15/279,010

(22) Filed: Sep. 28, 2016

(65) Prior Publication Data

US 2018/0091201 A1    Mar. 29, 2018

(51) Int. Cl.
*H04W 16/28* (2009.01)
*H04B 7/06* (2006.01)

(52) U.S. Cl.
CPC .......... *H04W 16/28* (2013.01); *H04B 7/0602* (2013.01)

(58) Field of Classification Search
CPC ............................ H04W 16/28; H04B 7/0602
See application file for complete search history.

(56) References Cited

U.S. PATENT DOCUMENTS

| 9,537,559 B1* | 1/2017 | Liu | H04B 7/0814 |
| 2006/0034165 A1* | 2/2006 | Levy | H04B 7/0417 370/208 |
| 2006/0223450 A1* | 10/2006 | Dacosta | H04B 1/005 455/73 |
| 2007/0189235 A1* | 8/2007 | Chandra | H04B 7/2612 370/335 |

(Continued)

OTHER PUBLICATIONS

IEEE Std 802.111™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Christopher M Crutchfield
*Assistant Examiner* — Tito Q Pham
(74) *Attorney, Agent, or Firm* — Shichrur & Co.

(57) ABSTRACT

Some demonstrative embodiments include apparatuses, devices, systems and methods of communicating via a plurality of antennas. For example, an apparatus may include a plurality of Physical layer (PHY) components including circuitry to process communication of a wireless station over a directional frequency band; a plurality of lower Medium Access Control (MAC) components to control channel access of the plurality of PHY components; a plurality of switch components configured to connect between respective PHY components of the plurality of PHY components and a plurality of antennas of the wireless (Continued)

station; and an upper MAC component configured to determine an antenna allocation of the plurality of antennas to the plurality of PHY components, and to control the plurality of switch components to connect the plurality of PHY components to the plurality of antennas according to the antenna allocation.

25 Claims, 5 Drawing Sheets

(56) References Cited

U.S. PATENT DOCUMENTS

| | | | | |
|---|---|---|---|---|
| 2010/0022261 A1* | 1/2010 | Meier | | H04B 7/0604 |
| | | | | 455/500 |
| 2010/0330915 A1* | 12/2010 | Parizhsky | | H04B 7/0608 |
| | | | | 455/63.1 |
| 2012/0014335 A1* | 1/2012 | Adachi | | H04W 48/08 |
| | | | | 370/329 |
| 2013/0100897 A1* | 4/2013 | Negus | | H04W 84/12 |
| | | | | 370/329 |
| 2015/0055526 A1* | 2/2015 | Shao | | H04W 76/025 |
| | | | | 370/310.2 |
| 2015/0208389 A1* | 7/2015 | Imamura | | H04J 11/00 |
| | | | | 370/329 |
| 2016/0127088 A1* | 5/2016 | Lou | | H04B 7/0452 |
| | | | | 370/330 |
| 2016/0135175 A1* | 5/2016 | Tarlazzi | | H04W 28/08 |
| | | | | 370/329 |
| 2017/0004102 A1* | 1/2017 | Jooris | | H04L 69/324 |
| 2017/0150510 A1* | 5/2017 | Islam | | H04L 5/006 |
| 2017/0237482 A1* | 8/2017 | Noerpel | | H04B 7/18513 |
| | | | | 455/427 |
| 2018/0077547 A1* | 3/2018 | Sanchez Barajas | | H04B 7/04 |

OTHER PUBLICATIONS

IEEE Std 802.11ad™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

* cited by examiner

APPARATUS, SYSTEM AND METHOD OF COMMUNICATING VIA A PLURALITY OF ANTENNAS

TECHNICAL FIELD

Embodiments described herein generally relate to communicating via a plurality of antennas.

BACKGROUND

A wireless communication network in a millimeter-wave band may provide high-speed data access for users of wireless communication devices.

Some Specifications may be configured to support a Multi User (MU) system, in which an Access Point (AP) simultaneously transmits frames to a plurality of stations.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
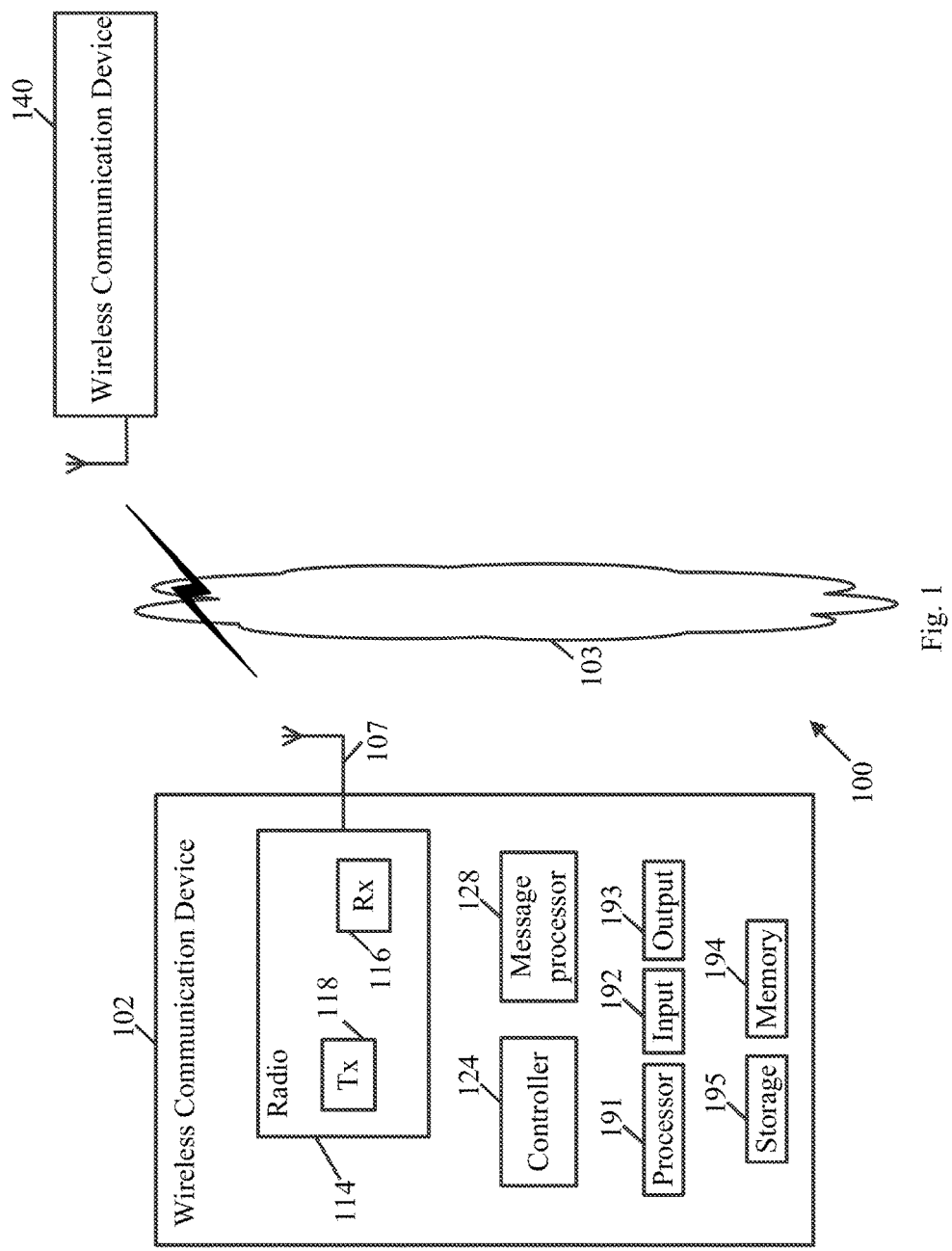
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2012 (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012); IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec. 2012); IEEE-802.11REVmc ("IEEE 802.11-REVmcTM/D3.0, June 2014 draft standard for Information technology—Telecommunications and information exchange between systems Local and metropolitan area networks Specific requirements; Part 11: Wireless LAN Medium Access Control (MAC) and Physical Layer (PHY)

Specification"); IEEE 802.11ax (IEEE 802.11ax, High Efficiency WLAN (HEW)); IEEE802.11-ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)) and/or future versions and/or derivatives thereof) and/or future versions and/or derivatives thereof, devices and/or networks operating in accordance with existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing Wireless Fidelity (WiFi) Alliance (WFA) Peer-to-Peer (P2P) specifications (WiFi P2P technical specification, version 1.5, Aug. 4, 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, devices and/or networks operating in accordance with existing Bluetooth (BT) specifications and/or protocols and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a frequency band above 45 GHZ, a frequency band below 20 GHZ, e.g., a Sub 1 GHZ (S1G) band, a 2.4 GHz band, a 5 GHZ band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., 7 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102, and/or one or more wireless communication devices 140.

In some demonstrative embodiments, device 102 may include a mobile device or a non-mobile, e.g., a static, device.

For example, device 102 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195. Device 102 may optionally include other suitable hardware components and/or software components. In some demonstrative embodiments, some or all of the components of one or more of device 102 may be enclosed in a common housing or packaging, and may be interconnected or operably associated using one or more wired or wireless links. In other embodiments, components of one or more of device 102 may be distributed among multiple or separate devices.

In some demonstrative embodiments, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications.

In some demonstrative embodiments, input unit 192 may include, for example, a keyboard, a keypad, a mouse, a touch-screen, a touch-pad, a track-ball, a stylus, a microphone, or other suitable pointing device or input device. Output unit 193 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102.

In some demonstrative embodiments, device 102 may include and/or perform the functionality of one or more STAs. For example, device 102 may include at least one STA.

In some demonstrative embodiments, device 102 may include, operate as, and/or perform the functionality of one or more DMG STAs. For example, device 102 may include, operate as, and/or perform the functionality of, at least one DMG STA.

In other embodiments, device 102 may operate as and/or perform one or more functionalities of any other wireless device and/or station, e.g., a WLAN STA, a WiFi STA, and the like.

In some demonstrative embodiments, device 102 may be configured to operate as, perform a role of, and/or perform the functionality of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, device 102 may be configured to operate as, perform a role of, and/or perform the functionality of, a non-AP STA, e.g., a DMG non-AP STA, and/or a non-PCP STA, e.g., a DMG non-PCP STA, for example, a non-AP/PCP STA, e.g., a DMG non-AP/PCP STA.

In other embodiments, device 102 may operate as, perform a role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments, wireless communication device 102 may be capable of communicating content, data, information and/or signals via a wireless medium (WM) 103. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, WM 103 may include one or more directional bands and/or channels. For example, WM 103 may include one or more millimeter-wave (mmWave) wireless communication bands and/or channels.

In some demonstrative embodiments, WM 103 may include one or more DMG channels. In other embodiments, WM 103 may include any other directional channels.

In some demonstrative embodiments, device 102 may include one or more radios including circuitry and/or logic to perform wireless communication between devices 102 and/or one or more other wireless communication devices. For example, device 102 may include at least one radio 114.

In some demonstrative embodiments, radio 114 may include one or more wireless receivers (Rx) including circuitry and/or logic to receive wireless communication signals, RF signals, frames, blocks, transmission streams, packets, messages, data items, and/or data. For example, radio 114 may include at least one receiver 116.

In some demonstrative embodiments, radio 114 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118.

In some demonstrative embodiments, radio 114, transmitter 118, and/or receiver 116 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 may include or may be implemented as part of a wireless Network Interface Card (NIC), and the like.

In some demonstrative embodiments, radio 114 may be configured to communicate over a directional band, for example, a mmWave band, and/or any other band, for example, a 2.4 GHz band, a 5 GHz band, a S1G band, and/or any other band.

In some demonstrative embodiments, radio 114 may include, or may be associated with, a plurality of antennas 107.

Antennas 107 may include any type of antennas suitable for transmitting and/or receiving wireless communication signals, blocks, frames, transmission streams, packets, messages and/or data. For example, Antennas 107 may include any suitable configuration, structure and/or arrangement of one or more antenna elements, components, units, assemblies and/or arrays. Antennas 107 may include, for example, antennas suitable for directional communication, e.g., using beamforming techniques. For example, Antennas 107 may include a phased array antenna, a multiple element antenna, a set of switched beam antennas, and/or the like. In some embodiments, Antennas 107 may implement transmit and receive functionalities using separate transmit and receive antenna elements. In some embodiments, Antennas 107 may implement transmit and receive functionalities using common and/or integrated transmit/receive elements.

In some demonstrative embodiments, antennas 107 may include a plurality of antennas, which may be steered to form a plurality of beam directions.

In some demonstrative embodiments, device 102 may include a controller 124 configured to perform one or more communications, may generate and/or communicate one or more messages and/or transmissions, and/or may perform one or more functionalities, operations and/or procedures between device 102 and one or more other devices, e.g., as described below.

In some demonstrative embodiments, controller 124 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controller 124. Additionally or alternatively, one or more functionalities of controller 124 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, message processor 128 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processor 128, respectively. Additionally or alternatively, one or more functionalities of message processor 128 may be implemented by logic, which may be executed by a machine and/or one or more processors, e.g., as described below.

In some demonstrative embodiments, at least part of the functionality of message processor 128 may be implemented as part of radio 114.

In some demonstrative embodiments, at least part of the functionality of message processor 128 may be implemented as part of controller 124.

In other embodiments, the functionality of message processor 128 may be implemented as part of any other element of device 102.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

Some demonstrative embodiments may be implemented, for example, in accordance with a new standard in an mmWave band, e.g., a 60 GHz frequency band or any other directional band, for example, as an evolution of an IEEE 802.11ad standard.

In some demonstrative embodiments, device 102 may be configured according to one or more standards, for example, in accordance with an IEEE 802.11ay Standard, which may be, for example, configured to enhance the efficiency and/or performance of an IEEE 802.11ad Specification, which may be configured to provide Wi-Fi connectivity in a 60 GHz band.

Some demonstrative embodiments may enable, for example, to significantly increase data transmission rates defined in the IEEE 802.11ad specification, which may, for example, satisfy growing demand in network capacity for new coming applications.

Some communications over a wireless communication band, for example, a DMG band or any other band, may be performed over a single channel bandwidth (BW). For example, the IEEE 802.11ad Specification defines a 60 GHz system with a single channel bandwidth (BW) of 2.16 GHz, which is to be used by all Stations (STAs) for both transmission and reception.

In some demonstrative embodiments, device 102 may be configured to implement one or more mechanisms, which may, for example, enable to extend a single-channel BW scheme, e.g., a scheme in accordance with the IEEE 802.11ad Specification or any other scheme, for higher data rates and/or increased capabilities, e.g., as described below.

In some demonstrative embodiments, device 102 may be configured to implement one or more channel bonding mechanisms, which may, for example, support communication over bonded channels.

In some demonstrative embodiments, the channel bonding mechanisms may include, for example, a mechanism and/or an operation whereby two or more channels can be combined, e.g., for a higher bandwidth of packet transmission, for example, to enable achieving higher data rates, e.g., when compared to transmissions over a single channel. Some demonstrative embodiments are described herein with respect to communication over a bonded channel, however other embodiments may be implemented with respect to communications over a channel, e.g., a "wide" channel, including or formed by two or more channels, for example, an aggregated channel including an aggregation of two or more channels.

In some demonstrative embodiments, device 102 may be configured to implement one or more channel bonding mechanisms, which may, for example, support an increased channel bandwidth, for example, a channel BW of 4.32 GHz, a channel BW of 6.48 GHz, and/or any other additional or alternative channel BW.

In some demonstrative embodiments, device 102 may be configured to communicate over a Next Generation 60 GHz (NG60) network, an Extended DMG (EDMG) network, and/or any other network. For example, device 102 may be configured to use channel bonding, for example, for communicating over the NG60 and/or EDMG networks.

Some Specifications, e.g., an IEEE 802.11 ad Specification, may be configured to support a Single User (SU) system, in which a Station (STA) cannot transmit frames to more than a single STA at a time. Such Specifications may not be able, for example, to support a STA transmitting to multiple STAs simultaneously, for example, using a multi-user MIMO (MU-MIMO) scheme, e.g., a downlink (DL) MU-MIMO, or any other MU scheme.

In some demonstrative embodiments, device 102 may be configured to implement one or more Multi-User (MU)

mechanisms. For example, device 102 may be configured to implement one or more MU mechanisms, which may be configured to enable MU communication of Downlink (DL) frames using a Multiple-Input-Multiple-Output (MIMO) scheme, for example, between a device, e.g., device 102, and a plurality of devices, e.g., including one or more devices 140.

In some demonstrative embodiments, device 102 may be configured to communicate over a Next Generation 60 GHz (NG60) network, an Extended DMG (EDMG) network, and/or any other network. For example, device 102 may be configured to communicate MIMO, e.g., DL MU-MIMO, transmissions and/or use channel bonding, for example, for communicating over the NG60 and/or EDMG networks.

In some demonstrative embodiments, device 102 may be configured to support one or more mechanisms and/or features, for example, channel bonding, single user (SU) MIMO, and/or and multi user (MU) MIMO, for example, in accordance with an IEEE 802.11ay Standard and/or any other standard and/or protocol.

In some demonstrative embodiments, device 102 may include, operate as, perform a role of, and/or perform the functionality of, one or more EDMG STAs.

In one example, an EDMG STA may include a DMG STA whose radio transmitter is capable of transmitting and receiving EDMG physical layer (PHY) protocol data units (PPDUs). The EDMG STA may perform any other additional or alternative functionality.

In some demonstrative embodiments, device 102 may include one or more EDMG STAs capable of communicating in an EDMG BSS.

In some demonstrative embodiments, device 102 may include, operate as, perform a role of, and/or perform the functionality of, an AP STA. In other embodiments, device 102 may include, operate as, perform a role of, and/or perform the functionality of, a non-AP STA.

In some demonstrative embodiments, device 102 may be configured to perform MU-MIMO communication.

In some demonstrative embodiments, device 102 may be configured to communicate over a mmWave band, e.g., a 60 GHz frequency band or any other directional band, in which wireless communication may be directional.

In one example, device 102 may not be allowed to communicate data over a direction, e.g., if the direction is busy. According to this example, device 102 may be configured to explore one or more other directions to communicate data, for example, if device 102 is capable of simultaneous carrier sensing on the one or more other directions.

In some demonstrative embodiments, device 102 may be configured to communicate data over a plurality of different directions simultaneously, for example, if device 102 is capable of simultaneously handling multiple data transmissions. According to these embodiments, a mmWave device, e.g., device 102, may be capable of increasing a spatial reuse, e.g., compared to legacy Wi-Fi devices.

Some Specifications, e.g., the IEEE 802.11ad Specification, may define a wireless station architecture, e.g., of a DMG STA, which may limit a spatial reuse over different directions.

In one example, some Specifications, e.g., the IEEE 802.11ad Specification, may define that the DMG STA may have a plurality of antennas, e.g., DMG antennas, for example, to cover broader directions around the DMG STA, and only one PHY with a single Enhanced Distributed Channel Access (EDCA). According to this example, the DMG STA may not be able to support carrier sensing on different directions, and/or the DMG STA may not be able to handle parallel transmissions on different directions.

A multi-radio device having each radio of the multi-radio device being an independent STA, e.g., including a MAC component, a PHY component, and an RF component, which covers a different direction of the multi-radio device, may not be efficient, for example, since the multi-radio device may not provide coordination between radios of the multi-radio device, and/or since the multi-radio device may not be able to allocate channel access capabilities on MAC, and/or to allocate data processing capabilities on PHY among different directions.

For example, a multi-radio device may have sub-optimal efficiency of a spatial reuse, e.g., as described below.

In one example, for example, in one use case or implementation, the multi-radio device may have many neighbor stations on a certain direction corresponding to a radio of the multi-radio device, and a few neighbor stations on all other directions of other radios of the multi-radio device. According to this example, without any coordination and flexibility, a single MAC component and PHY component of the radio, e.g., one EDCA and one data processing capability, may be shared by the many neighbors in the certain direction, while a MAC component and a PHY component of each radio of the other radios may be utilized for communication with the few or even no neighbor stations in the other directions. Accordingly, the many neighbor stations using the radio may experience longer channel access delay and/or lower throughput, and the MAC component and the PHY component of the radio may be busy all the time, whereas the MAC component and the PHY component of the other radios may be idle, e.g., since only the few neighbor stations may try to access a channel via the other radios. As a result, neighbor stations using the busy radio of the certain direction may experience longer channel access delay and/or lower throughput, while the single MAC component and PHY component of the radio operating on the certain direction may be busy all the time. In contrast, MAC component and PHY component of the other radios may be idle for long periods of time, as few neighbors may access the channel on the directions o these other radios.

In some demonstrative embodiments, device 102 may implement an antenna switching architecture, which may enable dynamical spatial reuse, for example, by introducing one or more switches to switch a plurality of antennas between a plurality of PHY and/or MAC components, for example, a programmable switch matrix for each PHY component, e.g., as described below.

In some demonstrative embodiments, the programmable switch matrix may be connected to a plurality of antenna arrays, e.g., as described below.

In some demonstrative embodiments, the antenna switching architecture may include a plurality of switch matrices, a plurality of PHY components, a plurality of lower MAC components, and an upper MAC component as a central coordinator, e.g., as described below.

In some demonstrative embodiments, the antenna switching architecture may be configured to allocate PHY and/or lower MAC components dynamically, for example, based on one or more criteria, e.g., as described below.

In some demonstrative embodiments, the antenna switching architecture may be configured to enable, for example, at least dynamically switching of one or more antenna arrays from a first PHY component and/or a first lower MAC component to a second PHY component and/or a second lower MAC component, e.g., as described below.

In some demonstrative embodiments, the antenna switching architecture may be configured to enable, for example, at least allocating an increased number of PHY and/or lower MAC components to antenna arrays that cover a first direction, which has a higher spatial reuse demand, e.g., as described below.

In some demonstrative embodiments, the antenna switching architecture may be configured enable, for example, at least allocating a reduced number of PHY and/or lower MAC components to antenna arrays that cover a second direction, which has a lower spatial reuse demand, e.g., as described below.

In some demonstrative embodiments, allocating PHY and/or lower MAC components dynamically, for example, based on one or more criteria e.g., based on a spatial reuse demand, may enable, for example, to significantly improve a channel access delay and/or a throughput of neighbor stations, e.g., at the first direction may be significantly improved, for example, while not substantially degrading the access delay and/or the throughput of the neighbor stations at the second direction.

In some demonstrative embodiments, the antenna switching architecture may include a plurality of antennas, e.g., including a count of N antennas, e.g., a plurality of antenna arrays. For example, an antenna array of the N antenna arrays may cover a predefined direction around device 102. For example, antennas 107 may include the N antenna arrays.

In some demonstrative embodiments, the antenna switching architecture may be configured to support and/or enable dynamic management and/or operation of the plurality of N antennas, e.g., as described below.

In some demonstrative embodiments, device 102 may be configured to operate as, perform the role of, and/or perform one or more functionalities of a multi-antenna STA, which may include N antenna arrays, e.g., as described below.

In some demonstrative embodiments, device 102 may be configured to operate as, perform the role of, and/or perform one or more functionalities of a multi-antenna AP-STA, which may include N antenna arrays, e.g., as described below.

In some demonstrative embodiments, device 102, may be configured to operate as, perform the role of, and/or perform one or more functionalities of a multi-antenna STA or a multi-antenna AP-STA, which may be configured to perform unsynchronized MU-MIMO communication via the N antenna arrays, e.g., as described below.

In some demonstrative embodiments, the plurality of antenna arrays may be complementary, for example to enable quasi-omni coverage, e.g., as described below.

In some demonstrative embodiments, two or more antenna arrays of the plurality of antenna arrays may have at least partially overlapping coverage.

In some demonstrative embodiments, two or more antenna arrays of the plurality of antenna arrays may have non-overlapping coverage.

In some demonstrative embodiments, device 102 may include a plurality of antennas having different, non-overlapping coverage, e.g., as described below.

In some demonstrative embodiments, device 102 may include a plurality of antenna arrays, of which some antenna arrays or sectors may have non-overlapping coverage, while other antenna arrays or sectors may have overlapping coverage.

In some demonstrative embodiments, the plurality of antenna arrays may be configured to have different coverage, for example, to enable at least reducing interference between the antenna arrays, e.g., as described below.

In some demonstrative embodiments, an antenna array of the plurality of antenna arrays, e.g., each antenna array, may be fully independent from other antennas of the plurality of antennas, e.g., as described below.

In one example, an antenna array may be configured to transmit or receive, for example, even without requiring any time synchronization with other antenna arrays of the plurality of antenna arrays. For example, a first antenna of the plurality of antennas may be able to transmit a transmission, even while a second antenna of the plurality of antennas may receive a transmission.

In some demonstrative embodiments, a beam width of a quasi-omni antenna pattern of an antenna array may overlap with one or more other antenna arrays. However, less overlap between the antenna arrays may enable better spatial utilization.

In some demonstrative embodiments, the N antenna arrays may be operated according to an assumption of Reciprocity, and/or directional EDCA, e.g., as described below.

In some demonstrative embodiments, device 102 may include a plurality of PHY and lower MAC components, e.g., including a count of M PHY and lower MAC components, e.g., as described below.

In some demonstrative embodiments, the number N of antenna arrays may be greater than or equal to the number M of PHY and lower MAC components.

In some demonstrative embodiments, a PHY component of the M PHY components may be configured to provide transmit (TX) and receive (RX) capabilities.

In some demonstrative embodiments, a lower MAC component of the M MAC components may be configured to provide channel access capabilities, e.g., EDCA channel access.

In some demonstrative embodiments, device 102 may include a plurality of switch matrices, for example, M switch matrices, e.g., a switch matrix per one PHY component and lower MAC component, as described below.

In some demonstrative embodiments, the M switch matrices may be configured to group the N antenna arrays into M groups, e.g., a group per a switch matrix. For example, a group may be configured to cover a broader direction, e.g., compared to a direction covered by one antenna array of the group.

In some demonstrative embodiments, a switch matrix may be configured to connect one or more antenna arrays of the N antenna arrays to a corresponding PHY component and MAC component, e.g., as described below.

In some demonstrative embodiments, device 102 may include an upper MAC component configured to determine an antenna allocation of the plurality of antennas to the plurality of PHY components, and to control the plurality of switch components to connect the plurality of PHY components to the plurality of antennas according to the antenna allocation, e.g., as described below. For example, the upper MAC component may be configured to allocate a PHY component to one or more antenna arrays in one or more different directions, for example, by controlling a switch matrix corresponding to the PHY component.

In some demonstrative embodiments, a PHY component of the M PHY components may be configured to provide TX and RX capabilities, for example, in a direction defined by one or more antenna arrays, which are allocated to the PHY component, e.g., via a corresponding switch matrix.

In some demonstrative embodiments, a lower MAC component of the M lower MAC components may be configured to control channel access over a directional channel in a corresponding direction of the one or more antenna arrays, which are allocated to the lower MAC component, e.g., via a corresponding switch matrix.

In some demonstrative embodiments, the upper MAC component may be configured, for example, to control the plurality of switch matrices, for example, to dynamically group the N antenna arrays into a plurality of directions, e.g., up to M directions, and/or to allocate the PHY components and lower MAC components to the plurality of directions.

In some demonstrative embodiments, the upper MAC component may be configured, for example, to control, handle, and or manage association functionalities, beamforming functionalities and/or one or more additional or alternative functionalities.

In some demonstrative embodiments, the upper MAC component may be configured, for example, to provide a higher spatial reuse resolution to directions that may have higher spatial reuse demand, e.g., directions with more beamformed neighbor stations or more traffic load.

Figure 2:
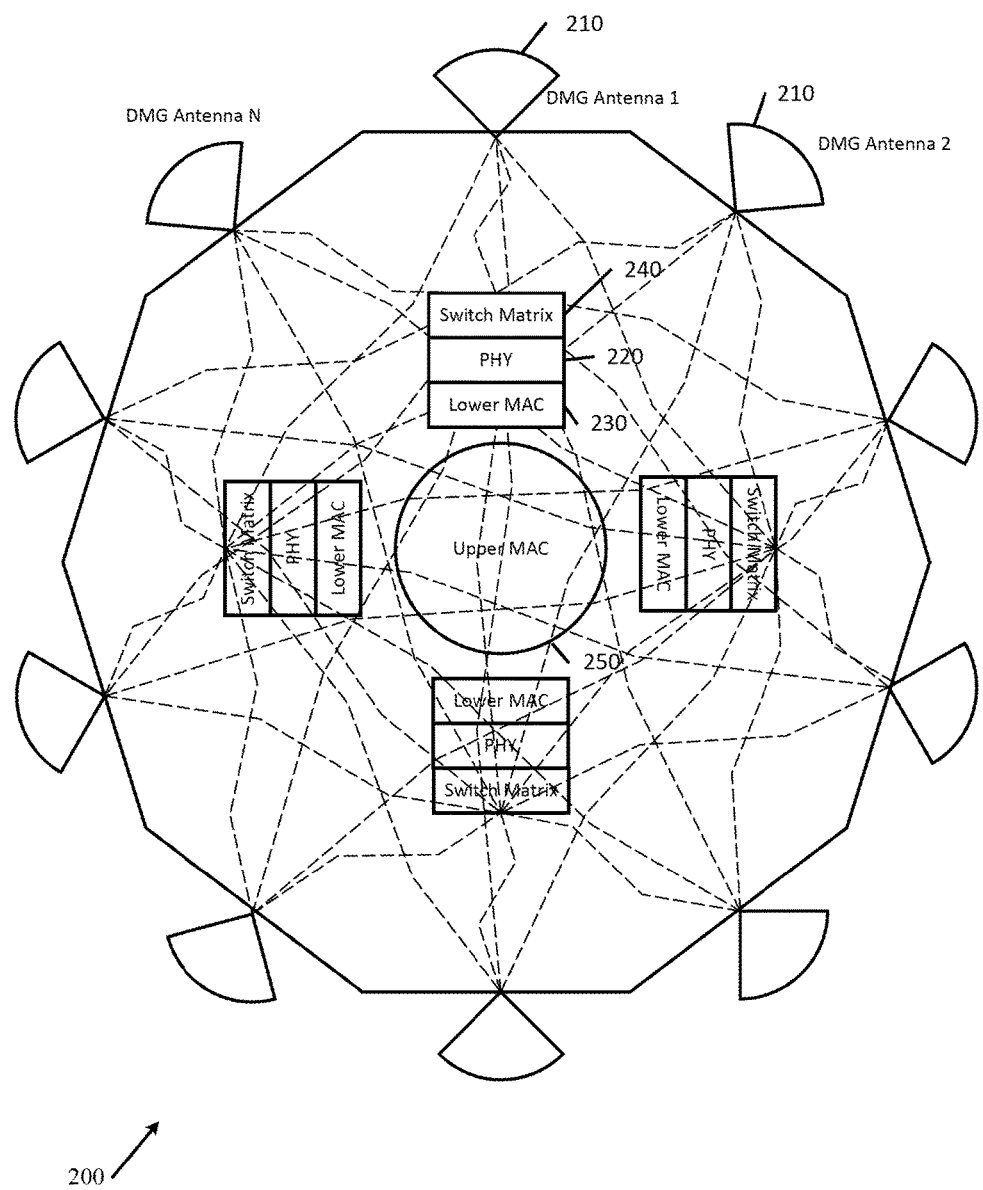
FIG. 2 is a schematic illustration of an antenna switching architecture of a wireless station, in accordance with some demonstrative embodiments.

Reference is made to FIG. 2, which schematically illustrates an antenna switching architecture of a wireless station 200, in accordance with some demonstrative embodiments. For example, device 102 (FIG. 1) may include components of wireless station 200.

In some demonstrative embodiments, a wireless STA, for example, an AP STA, e.g., device 102 (FIG. 1), may implement the architecture of wireless station 200, for example, to support and/or enable dynamic management and/or operation of a plurality of antennas, e.g., as described below.

In some demonstrative embodiments, as shown in FIG. 2, wireless station 200 may include a plurality of antennas 210.

In some demonstrative embodiments, the plurality of antennas may include, and/or may be implemented by, for example, antennas 107 (FIG. 1).

In some demonstrative embodiments, as shown in FIG. 2, wireless station 200 may include a plurality of Physical layer (PHY) components 220.

In some demonstrative embodiments, the plurality of PHY components 220 may include, and/or may be implemented, for example, by a respective plurality of PHY controllers. In one example, controller 124 (FIG. 1) and/or message processor 128 (FIG. 1) may include, perform the role of, perform one or more operations of, and/or perform one or more functionalities of the plurality of PHY components 220.

In some demonstrative embodiments, a PHY component 220 may include circuitry to process communication of wireless station 200 over a directional frequency band.

In some demonstrative embodiments, as shown in FIG. 2, wireless station 200 may include a plurality of lower MAC components 230 configured to control channel access of the plurality of PHY components 220.

In some demonstrative embodiments, as shown in FIG. 2, a count of the plurality of PHY components 220 may be equal to or less than a count of the plurality of antennas 210; and/or a count of the plurality of MAC components 230 may be equal to or less than a count of the plurality of antennas 210.

In some demonstrative embodiments, the plurality of lower MAC components 230 may include, and/or may be implemented, for example, by a respective plurality of lower MAC controllers. In one example, controller 124 (FIG. 1) and/or message processor 128 (FIG. 1) may include, perform the role of, perform one or more operations of, and/or perform one or more functionalities of the plurality of lower MAC components 230.

In some demonstrative embodiments, a lower MAC component 230 may be configured to control channel access of the wireless station 200 via one or more respective antennas of the plurality of antennas 210.

In one example, a lower MAC component 230 may be configured to manage and/or control, for example, at least a clear channel assessment (CCA), and/or an EDCAF over a channel via the one or more antennas associated with the lower MAC component 230.

In some demonstrative embodiments, as shown in FIG. 2, wireless station 200 may include a plurality of switch components 240 configured to connect between respective PHY components of the plurality of PHY components 220 and the plurality of antennas 210.

In some demonstrative embodiments, a switch component 240 of the plurality of switch components 240 may be configured to switch a connection of a respective PHY component of the plurality of PHY components 220 from at least one first antenna of the plurality of antennas 210 to at least one second antenna of the plurality of antennas 210.

In some demonstrative embodiments, a switch component 240 of the plurality of switch components 240 may be configured to connect a respective PHY component of the plurality of PHY components 220 to any antenna of the plurality of antennas 210.

In some demonstrative embodiments, each switch component 240 of the plurality of switch components 240 may be configured to connect a respective PHY component of the plurality of PHY components 220 to any antenna of the plurality of antennas 210. For example, a switch component 240 may be able to connect up to N, e.g., all, antenna arrays, to a single PHY/lower MAC component.

In other embodiments, switch components 240 may include at least one switch component 240, which may be configured to connect a respective PHY component of the plurality of PHY components 220 to only some antennas of the plurality of antennas 210.

In some demonstrative embodiments, as shown in FIG. 2, wireless station 200 may include an upper MAC component 250.

In some demonstrative embodiments, upper MAC component 250 may be configured to determine an antenna allocation of the plurality of antennas 210 to the plurality of PHY components 220, e.g., as described below.

In some demonstrative embodiments, upper MAC component 250 may be configured to control the plurality of switch components 240 to connect the plurality of PHY components 220 to the plurality of antennas 210, for example, according to the antenna allocation, e.g., as described below.

In some demonstrative embodiments, as shown in FIG. 2, upper MAC component 250 may be connected to, coupled to, associated with, and/or configured to manage and/or control, one or more operations of the plurality of PHY components 220, lower MAC components 230, and/ the plurality of switch components 240.

In some demonstrative embodiments, upper MAC component 250 may include, and/or may be implemented, for example, by an upper MAC controller. In one example, controller 124 (FIG. 1) and/or message processor 128 (FIG. 1) may include, perform the role of, perform one or more operations of, and/or perform one or more functionalities of upper MAC component 250.

In some demonstrative embodiments, upper MAC component 250 may be unique for a STA, e.g., an AP STA. For example, station 200 may include a single upper MAC component 250. In other embodiments, one or more functionalities of upper MAC component 250 may be distributed between two or more upper MAC components of the wireless station 200.

In some demonstrative embodiments, upper MAC component 250 may be configured to present a single MAC Service Access Point (SAP) to upper layers of the wireless station 200.

In some demonstrative embodiments, upper MAC component 250 may be configured to perform coordination between the plurality of antennas 210, to perform interference mitigation between the plurality of antennas 210, to handle association with one or more STAs, and/or to perform one or more additional or alternative upper-MAC operations and/or functionalities, e.g., as described below.

In some demonstrative embodiments, upper MAC component 250 may be configured to determine the antenna allocation to allocate no more than one PHY component of PHY components 220 per antenna of the plurality of antennas 210.

In some demonstrative embodiments, upper MAC component 250 may be configured to determine the antenna allocation to allocate one or more antennas of the plurality of antennas 210 to a same PHY component 220. In one example, the antenna allocation may be configured to allocate a single antenna of the plurality of antennas 210 to a PHY component 220.

In some demonstrative embodiments, upper MAC component 250 may be configured to determine the antenna allocation to allocate two or more antennas of the plurality of antennas 210 to a same PHY component 220. For example, the antenna allocation may be configured to allocate two antennas, three antennas, or a greater number of the plurality of antennas 210, e.g., even all antennas 210, to the PHY component 220.

In some demonstrative embodiments, upper MAC component 250 may be configured to determine the antenna allocation to allocate a first count of one or more first antennas of the plurality of antennas 210 to a first PHY component of the plurality of PHY components 220, and a second count of one or more second antennas of the plurality of antennas 210 to a second PHY component of the plurality of PHY components 220.

In some demonstrative embodiments, the second count may be different from the first count. For example, the second count may be greater than the first count or lesser than the first count.

In some demonstrative embodiments, the second count may be equal to the first count.

In some demonstrative embodiments, upper MAC component 250 may be configured to allocate the plurality of PHY components 220 to the plurality of antennas 210, for example, based on one or more criteria, e.g., as described below.

In some demonstrative embodiments, upper MAC component 250 may be configured to manage PHY components 220 and lower MAC components 230 as resources to be allocated to the plurality of antennas 210, for example, based on one or more criteria, for example, a demand-based criterion, a spatial reuse criterion, and/or any other additional or alternative criterion, e.g., as described below.

In some demonstrative embodiments, upper MAC component 250 may determine and/or may be aware of, e.g., based on a beamforming procedure with other wireless stations, a best antenna ID and a sector ID of an antenna of the plurality of antennas 210 for one or more neighboring STAs of wireless station 200, or a best antenna ID and a sector ID of an antenna of the plurality of antennas 210 for one or more associated STAs, e.g., if wireless station 200 performs a role of an AP. For example, a best TX antenna ID may be also a best RX antenna ID, and/or a best TX sector ID may be also a best RX sector ID, for example, assuming the antennas arrays are reciprocal.

In some demonstrative embodiments, upper MAC component 250 may be configured to determine the antenna allocation to allocate an antenna of the plurality of antennas 210 to a PHY component of the plurality of PHY components 220, for example, based on at least on a direction covered by the antenna.

In some demonstrative embodiments, upper MAC component 250 may be configured to determine the antenna allocation to a criterion relating to a number of best sectors on each antenna array of the plurality of antennas 210. For example, one or more first antenna arrays ("busy antenna arrays") of the plurality of antennas 210 may have the best sector of many beamformed neighboring STAs, and accordingly, the first antenna arrays may have higher spatial reuse demand; while one or more second antenna arrays ("reduced-activity antenna arrays") of the plurality of antennas 210 may have best sector of few beamformed neighboring STAs, and accordingly, the second antenna arrays may have lower spatial reuse demand.

In some demonstrative embodiments, upper MAC component 250 may be configured to determine the antenna allocation to allocate an antenna of the plurality of antennas 210 to a PHY component of the plurality of PHY components 220, for example, based on at least a count of antenna sectors of the antenna, which may be beamformed to communicate with one or more wireless stations.

In one example, station 200 may include first and second PHY components 220, and four antennas 210, e.g., a first antenna, a second antenna, a third antenna and a fourth antenna. In one use case, each of the first, second, and third antennas may have four best sectors, e.g., to communicate with four or more wireless STAs, while the fourth antenna may have ten best sectors, e.g. to communicate with ten or more wireless STAs. According to this example, upper MAC component 250 may allocate the first PHY component 220 to the first, second, and third antennas, and/or the second PHY component 220 to the fourth antenna.

In some demonstrative embodiments, upper MAC component 250 may be configured to determine the antenna allocation to allocate an antenna of the plurality of antennas 210 to a PHY component of the plurality of PHY components 220, for example, based on at least a count of wireless stations to be communicated via the antenna.

In one example, station 200 may include first and second PHY components 220, and four antennas 210, e.g., a first antenna, a second antenna, a third antenna and a fourth antenna. In one use case, each of the first, second, and third antennas may communicate with four STA, while the fourth antenna may communicate with ten STAs. According to this example, upper MAC component 250 may allocate the first PHY component 220 to the first, second, and third antennas, and/or the second PHY component 220 to the fourth antenna.

In some demonstrative embodiments, upper MAC component 250 may be configured to determine the antenna allocation according to a criterion relating to the traffic load on each antenna array of the plurality of antennas 210. For example, one or more first antenna arrays may be busy antenna arrays, e.g., having heavy traffic load, and, accordingly, the first antenna arrays may have higher spatial reuse demand; and/or second antenna arrays may be reduced-activity antenna arrays, which may have light traffic load, and accordingly, the second antenna arrays may have lower spatial reuse demand.

In some demonstrative embodiments, upper MAC component 250 may be configured to determine the antenna allocation to allocate an antenna of the plurality of antennas 210 to a PHY component of the plurality of PHY components 220, for example, based on a traffic load of traffic to be communicated via the antenna.

In one example, station 200 may include first and second PHY components 220, and four antennas 210, e.g., a first antenna, a second antenna, a third antenna and a fourth antenna. In one use case, each of the first, second, and third antennas may have a reduced traffic load, while the fourth antenna has an increased traffic load, e.g., equal to or greater than a total of traffic load of two or more of the first, second, and third antennas. According to this example, upper MAC component 250 may allocate the first PHY component 220 to the first, second, and third antennas, and/or the second PHY component 220 to the fourth antenna.

In some demonstrative embodiments, upper MAC component 250 may be configured to determine the antenna allocation according to a Quality of Service (QoS) criterion.

In some demonstrative embodiments, upper MAC component 250 may be configured to determine the antenna allocation to allocate an antenna of the plurality of antennas 210 to a PHY component of the plurality of PHY components 220, for example, based on a QoS criterion to communicate with one or more wireless stations via the antenna.

In some demonstrative embodiments, the QoS criterion may include at least a delay constraint and/or one or more constraints and/or requirements to communicate with the one or more wireless stations via the antenna.

In some demonstrative embodiments, upper MAC component 250 may be configured to distribute each PHY component 220 to a set of antennas, for example, such that the number of wireless stations that each set of antennas communicated with via a corresponding PHY component 220 may be relatively even.

In one example, upper MAC component 250 may be configured to provide higher spatial reuse resolution to one or more busy (popular) antenna arrays 210, for example, by assigning a dedicated PHY component 220 and a dedicated lower MAC component 230 to the busy antenna arrays, e.g., using the switch matrix. In one example, a bust antenna array, e.g., each busy antenna array, may be associated with a dedicated PHY component 220 and a dedicated lower MAC component 230.

In another example, upper MAC component 250 may be configured to provide less spatial reuse resolution to one or more less-active (unpopular) antenna arrays 210, for example, by assigning a PHY component 210 and a lower MAC component 230 to a set of two or more unpopular antenna arrays, e.g., using the switch matrix. For example, four reduced-activity antenna arrays may be allocated to share a single PHY component 220 and a single lower MAC component 230.

In some demonstrative embodiments, upper MAC component 250 may be configured to update the antenna allocation, for example, based at least on a beamforming procedure between the wireless station 200 and at least one other wireless station.

Figure 3:
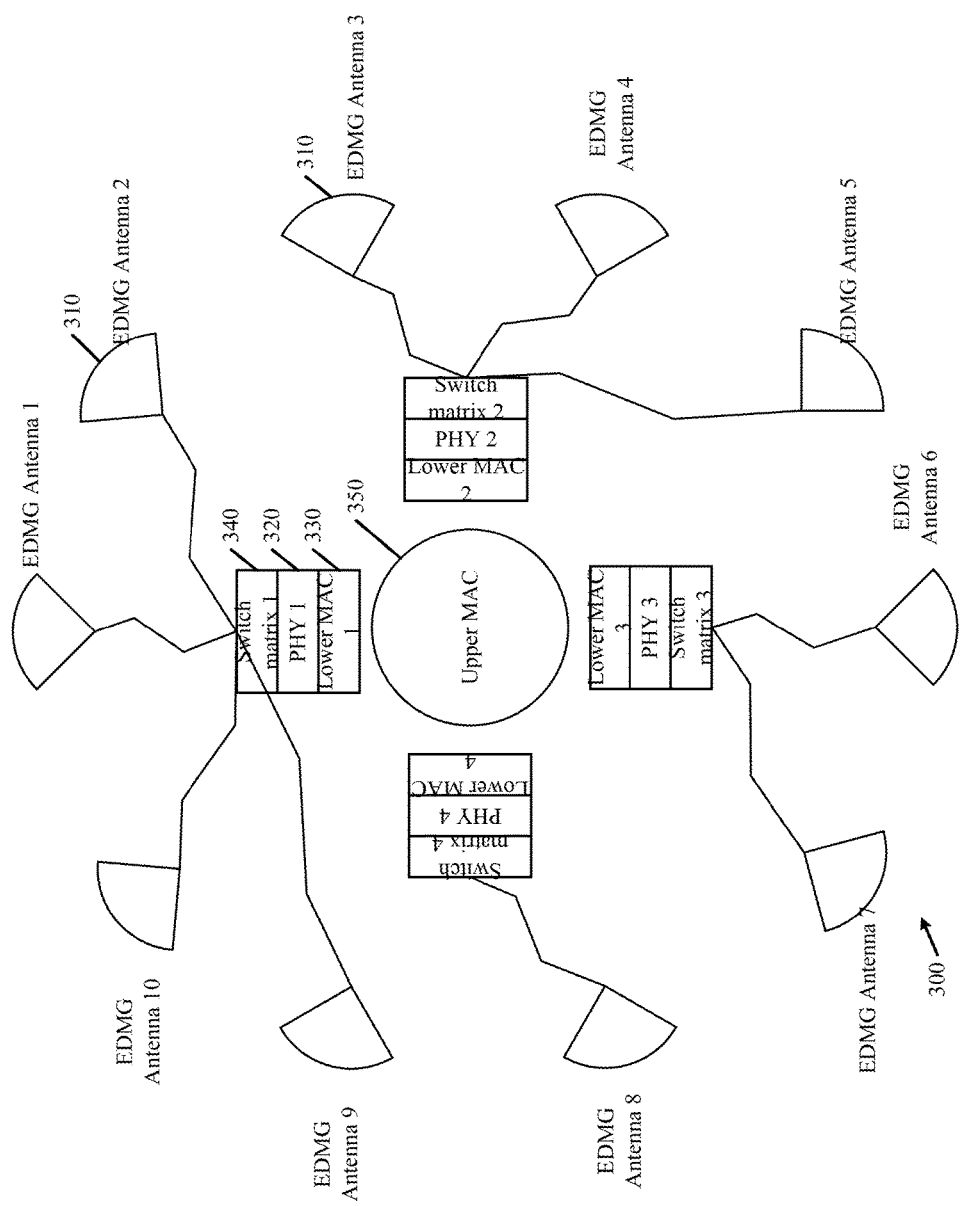
FIG. 3 is a schematic illustration of an antenna allocation of a plurality of antennas of a wireless station, in accordance with some demonstrative embodiments.

Reference is made to FIG. 3, which schematically illustrates an antenna allocation of a plurality of antennas 310 of a wireless station 300, in accordance with some demonstrative embodiments. For example, wireless station 300 may perform the functionality of device 102 (FIG. 1) and/or wireless station 200 (FIG. 2).

In some demonstrative embodiments, the antenna allocation of FIG. 3 may be implemented with the architecture of FIG. 2.

In some demonstrative embodiments, as shown in FIG. 3, wireless station 300 may include ten antennas 310, denoted EDMG antennas 1-10, four PHY components 320, denoted PHY 1-4, four lower MAC components 330, denoted Lower MAC 1-4, four switch components 340, denoted Switch Matrix 1-4, and/or one upper MAC component 350. For example, antennas 310 (FIG. 3) may perform the functionality of antennas 210 (FIG. 2); PHY components 320 (FIG. 3) may perform the functionality of PHY components 220 (FIG. 2); lower MAC components 330 (FIG. 3) may perform the functionality of lower MAC components 230 (FIG. 2); switch components 340 may perform the functionality of switch components 240 (FIG. 2); and/or upper MAC component 350 may perform the functionality of upper MAC component 250 (FIG. 2).

In some demonstrative embodiments, upper MAC component 350 may allocate the plurality of antennas 310 to the plurality of PHY components 320, for example, based on criteria criterion relating to a number of best sectors. In other embodiments, upper MAC component 350 may allocate the plurality of antennas 310 to the plurality of PHY components 320, for example, based on any other additional or alternative criteria, e.g., the QoS criterion.

In some demonstrative embodiments, after a beamforming procedure, the upper MAC component 350 may be aware of a best antenna ID and a sector ID for each beamformed neighboring STA.

For example, antenna array 8 may have the greatest number of best sectors, e.g., compared to antenna arrays 1-7 and antenna arrays 9-10. According to this example, as shown in FIG. 3, upper MAC component 350 may allocate a single PHY component 320 and lower MAC component 330, e.g., PHY 4 and lower MAC 4, to be dedicated to antenna array 8.

For example, antenna array 6 and antenna array 7 may have a large number of best sectors, e.g., compared to antenna arrays 1-5 and antenna arrays 9-10. According to this example, as shown in FIG. 3, upper MAC component 350 may allocate a single PHY component 320 and lower MAC component 330, e.g., PHY 3 and lower MAC 3, to be shared by antenna arrays 6 and 7.

For example, antenna arrays 3-5 may have a few best sectors, e.g., less than antenna array 6 and 7. According to this example, as shown in FIG. 3, upper MAC component 350 may allocate a single PHY component 320 and lower MAC component 330, e.g., PHY 2 and lower MAC 2, to be shared by antenna arrays 3-5.

For example, antenna arrays 1, 2, 9, and 10 may have the least number of best sectors, e.g., less than antenna arrays 3-5. According to this example, as shown in FIG. 3, upper MAC component 350 may allocate a single PHY component 320 and lower MAC component 330, e.g., PHY 1 and lower MAC 1, to be shared by antenna arrays 1, 2, 9, and 10.

In some demonstrative embodiments, upper MAC component 350 may be configured to update the antenna allocation, for example, if the current distribution of best sectors between antennas 1-10 is changed, e.g., after performing a beamforming procedure.

Figure 4:
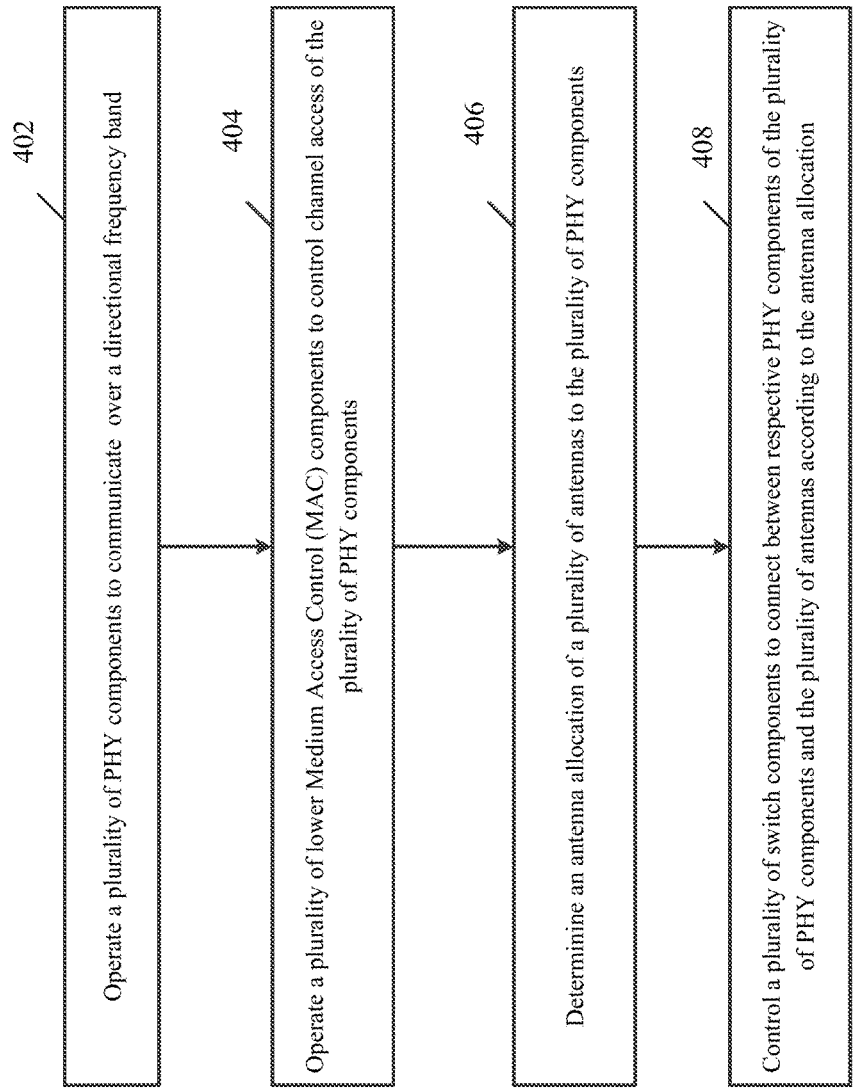
FIG. 4 is a schematic flow-chart illustration of a method of communicating via a plurality of antennas, in accordance with some demonstrative embodiments.

Reference is made to FIG. 4, which schematically illustrates a method of communicating via a plurality of antennas, in accordance with some demonstrative embodiments. For example, one or more of the operations of the method of FIG. 4 may be performed by one or more elements of a system, e.g., system 100 (FIG. 1), for example, one or more wireless devices, e.g., device 102 (FIG. 1); a controller, e.g., controller 124 (FIG. 1); a radio, e.g., radio 114 (FIG. 1); a transmitter, e.g., transmitter 118 (FIG. 1); a receiver e.g., receiver 116 (FIG. 1); a message processor, e.g., message processor 128 (FIG. 1); a lower MAC component, e.g., lower MAC components 230 (FIG. 2), and/or lower MAC components 330 (FIG. 3); a PHY component, e.g., PHY components 220 (FIG. 2), and/or PHY components 320 (FIG. 3); and/or an upper MAC component, e.g., upper MAC component 250 (FIG. 2), and/or upper MAC component 350 (FIG. 2).

As indicated at block 402, the method may include operating a plurality of PHY components to communicate over a directional frequency band. For example, upper MAC component 250 (FIG. 2) may operate the plurality of PHY components 220 (FIG. 2) to communicate over the directional frequency band, e.g., as described above.

As indicated at block 404, the method may include operating a plurality of lower MAC components to control channel access of the plurality of PHY components. For example, lower MAC components 230 (FIG. 2) may control channel access of the plurality of PHY components 220 (FIG. 2), e.g., as described above.

As indicated at block 406, the method may include determining an antenna allocation of a plurality of antennas to the plurality of PHY components. For example, upper MAC component 250 (FIG. 2) may determine the antenna allocation of the plurality of antennas 210 (FIG. 2) to the plurality of PHY components 220 (FIG. 2), e.g., as described above.

As indicated at block 408, the method may include controlling a plurality of switch components to connect between respective PHY components of the plurality of PHY components and the plurality of antennas according to the antenna allocation. For example, upper MAC component 350 (FIG. 3) may control the plurality of switch components 340 (FIG. 3) to connect between respective PHY components the plurality of PHY components 320 (FIG. 3) and the plurality of antennas 310 (FIG. 3), for example, according to the antenna allocation of FIG. 3, e.g., as described above.

Figure 5:
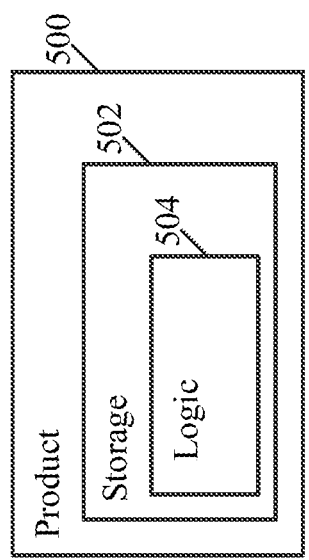
FIG. 5 is a schematic illustration of a product of manufacture, in accordance with some demonstrative embodiments.

Reference is made to FIG. 5, which schematically illustrates a product of manufacture 500, in accordance with some demonstrative embodiments. Product 500 may include one or more tangible computer-readable non-transitory storage media 502, which may include computer-executable instructions, e.g., implemented by logic 504, operable to, when executed by at least one computer processor, enable the at least one computer processor to implement one or more operations at device 102 (FIG. 1), radio 114 (FIG. 1), transmitter 118 (FIG. 1), receiver 116 (FIG. 1), controller 124 (FIG. 1), message processor 128 (FIG. 1), wireless station 200 (FIG. 200), wireless station 300 (FIG. 3), PHY components 220 (FIG. 2), PHY components 320 (FIG. 3), lower MAC components 230 (FIG. 2), lower MAC components 330 (FIG. 3), switch components 240 (FIG. 2), switch components 340 (FIG. 3), upper MAC component 250 (FIG. 2), and/or upper MAC component 350 (FIG. 3), and/or to perform, trigger and/or implement one or more operations, communications and/or functionalities as described above with reference to FIGS. 1, 2, 3, and/or 4, and/or one or more operations described herein. The phrase "non-transitory machine-readable medium" is directed to include all computer-readable media, with the sole exception being a transitory propagating signal.

In some demonstrative embodiments, product 500 and/or storage media 502 may include one or more types of computer-readable storage media capable of storing data, including volatile memory, non-volatile memory, removable or non-removable memory, erasable or non-erasable memory, writeable or re-writeable memory, and the like. For example, storage media 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, firmware, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, C#, Java, Python, BASIC, Matlab, Pascal, Visual BASIC, assembly language, machine code, and the like.

EXAMPLES

The following examples pertain to further embodiments.

Example 1 includes an apparatus comprising a plurality of Physical layer (PHY) components comprising circuitry to process communication of a wireless station over a directional frequency band; a plurality of lower Medium Access Control (MAC) components to control channel access of the plurality of PHY components; a plurality of switch components configured to connect between respective PHY components of the plurality of PHY components and a plurality of antennas of the wireless station; and an upper MAC component configured to determine an antenna allocation of the plurality of antennas to the plurality of PHY components, and to control the plurality of switch components to connect the plurality of PHY components to the plurality of antennas according to the antenna allocation.

Example 2 includes the subject matter of Example 1, and optionally, wherein the antenna allocation is to allocate no more than one PHY component per antenna.

Example 3 includes the subject matter of Example 1 or 2, and optionally, wherein the antenna allocation is to allocate two or more antennas of the plurality of antennas to a same PHY component.

Example 4 includes the subject matter of any one of Examples 1-3, and optionally, wherein the antenna allocation is to allocate a first count of one or more first antennas of the plurality of antennas to a first PHY component of the plurality of PHY components, and a second count of one or more second antennas of the plurality of antennas to a second PHY component of the plurality of PHY components, the second count is different from the first count.

Example 5 includes the subject matter of any one of Examples 1-4, and optionally, wherein the antenna allocation is to allocate an antenna of the plurality of antennas to a PHY component of the plurality of PHY components based at least on a direction covered by the antenna.

Example 6 includes the subject matter of any one of Examples 1-5, and optionally, wherein the antenna allocation is to allocate an antenna of the plurality of antennas to a PHY component of the plurality of PHY components based at least on a count of antenna sectors of the antenna, which are beamformed to communicate with one or more wireless stations.

Example 7 includes the subject matter of any one of Examples 1-6, and optionally, wherein the antenna allocation is to allocate an antenna of the plurality of antennas to a PHY component of the plurality of PHY components based at least on a count of wireless stations to be communicated via the antenna.

Example 8 includes the subject matter of any one of Examples 1-7, and optionally, wherein the antenna allocation is to allocate an antenna of the plurality of antennas to a PHY component of the plurality of PHY components based at least on a traffic load of traffic to be communicated via the antenna.

Example 9 includes the subject matter of any one of Examples 1-8, and optionally, wherein the antenna allocation is to allocate an antenna of the plurality of antennas to a PHY component of the plurality of PHY components based at least on a Quality of Service (QoS) criterion to communicate with one or more wireless stations via the antenna.

Example 10 includes the subject matter of Example 9, and optionally, wherein the QoS criterion comprises at least a delay constraint to communicate with the one or more wireless stations via the antenna.

Example 11 includes the subject matter of any one of Examples 1-10, and optionally, wherein the upper MAC component is configured to update the antenna allocation based at least on a beamforming procedure between the wireless station and at least one other wireless station.

Example 12 includes the subject matter of any one of Examples 1-11, and optionally, wherein a switch component of the plurality of switch components is to switch a connection of a respective PHY component of the plurality of PHY components from at least one first antenna of the plurality of antennas to at least one second antenna of the plurality of antennas.

Example 13 includes the subject matter of any one of Examples 1-12, and optionally, wherein a switch component of the plurality of switch components is able to connect a respective PHY component of the plurality of PHY components to any antenna of the plurality of antennas.

Example 14 includes the subject matter of any one of Examples 1-13, and optionally, wherein a count of the plurality of PHY components is less than a count of the plurality of antennas.

Example 15 includes the subject matter of any one of Examples 1-14, and optionally, wherein the wireless station comprises an Access Point (AP).

Example 16 includes the subject matter of any one of Examples 1-15, and optionally, comprising a memory and a processor.

Example 17 includes a system of wireless communication comprising a wireless station, the wireless station comprising a plurality of antennas; a memory; a processor; a plurality of Physical layer (PHY) components comprising circuitry to process communication over a directional frequency band; a plurality of lower Medium Access Control (MAC) components to control channel access of the plurality of PHY components; a plurality of switch components configured to connect between respective PHY components of the plurality of PHY components and the plurality of antennas; and an upper MAC component configured to determine an antenna allocation of the plurality of antennas to the plurality of PHY components, and to control the plurality of switch components to connect the plurality of PHY components to the plurality of antennas according to the antenna allocation.

Example 18 includes the subject matter of Example 17, and optionally, wherein the antenna allocation is to allocate no more than one PHY component per antenna.

Example 19 includes the subject matter of Example 17 or 18, and optionally, wherein the antenna allocation is to allocate two or more antennas of the plurality of antennas to a same PHY component.

Example 20 includes the subject matter of any one of Examples 17-19, and optionally, wherein the antenna allocation is to allocate a first count of one or more first antennas of the plurality of antennas to a first PHY component of the plurality of PHY components, and a second count of one or more second antennas of the plurality of antennas to a second PHY component of the plurality of PHY components, the second count is different from the first count.

Example 21 includes the subject matter of any one of Examples 17-20, and optionally, wherein the antenna allocation is to allocate an antenna of the plurality of antennas to a PHY component of the plurality of PHY components based at least on a direction covered by the antenna.

Example 22 includes the subject matter of any one of Examples 17-21, and optionally, wherein the antenna allocation is to allocate an antenna of the plurality of antennas to a PHY component of the plurality of PHY components based at least on a count of antenna sectors of the antenna, which are beamformed to communicate with one or more wireless stations.

Example 23 includes the subject matter of any one of Examples 17-22, and optionally, wherein the antenna allocation is to allocate an antenna of the plurality of antennas to a PHY component of the plurality of PHY components based at least on a count of wireless stations to be communicated via the antenna.

Example 24 includes the subject matter of any one of Examples 17-23, and optionally, wherein the antenna allocation is to allocate an antenna of the plurality of antennas to a PHY component of the plurality of PHY components based at least on a traffic load of traffic to be communicated via the antenna.

Example 25 includes the subject matter of any one of Examples 17-24, and optionally, wherein the antenna allocation is to allocate an antenna of the plurality of antennas to a PHY component of the plurality of PHY components based at least on a Quality of Service (QoS) criterion to communicate with one or more wireless stations via the antenna.

Example 26 includes the subject matter of Example 25, and optionally, wherein the QoS criterion comprises at least a delay constraint to communicate with the one or more wireless stations via the antenna.

Example 27 includes the subject matter of any one of Examples 17-26, and optionally, wherein the upper MAC component is configured to update the antenna allocation based at least on a beamforming procedure between the wireless station and at least one other wireless station.

Example 28 includes the subject matter of any one of Examples 17-27, and optionally, wherein a switch component of the plurality of switch components is to switch a connection of a respective PHY component of the plurality of PHY components from at least one first antenna of the plurality of antennas to at least one second antenna of the plurality of antennas.

Example 29 includes the subject matter of any one of Examples 17-28, and optionally, wherein a switch component of the plurality of switch components is able to connect a respective PHY component of the plurality of PHY components to any antenna of the plurality of antennas.

Example 30 includes the subject matter of any one of Examples 17-29, and optionally, wherein a count of the plurality of PHY components is less than a count of the plurality of antennas.

Example 31 includes the subject matter of any one of Examples 17-30, and optionally, wherein the wireless station comprises an Access Point (AP).

Example 32 includes a method to be performed at a wireless station, the method comprising operating a plurality of Physical layer (PHY) components to communicate over a directional frequency band; operating a plurality of lower Medium Access Control (MAC) components to control channel access of the plurality of PHY components; determining an antenna allocation of a plurality of antennas to the plurality of PHY components; and controlling a plurality of switch components to connect between respective PHY components of the plurality of PHY components and the plurality of antennas according to the antenna allocation.

Example 33 includes the subject matter of Example 32, and optionally, wherein the antenna allocation is to allocate no more than one PHY component per antenna.

Example 34 includes the subject matter of Example 32 or 33, and optionally, wherein the antenna allocation is to allocate two or more antennas of the plurality of antennas to a same PHY component.

Example 35 includes the subject matter of any one of Examples 32-34, and optionally, wherein the antenna allocation is to allocate a first count of one or more first antennas of the plurality of antennas to a first PHY component of the plurality of PHY components, and a second count of one or more second antennas of the plurality of antennas to a second PHY component of the plurality of PHY components, the second count is different from the first count.

Example 36 includes the subject matter of any one of Examples 32-35, and optionally, wherein the antenna allocation is to allocate an antenna of the plurality of antennas to a PHY component of the plurality of PHY components based at least on a direction covered by the antenna.

Example 37 includes the subject matter of any one of Examples 32-36, and optionally, wherein the antenna allocation is to allocate an antenna of the plurality of antennas to a PHY component of the plurality of PHY components based at least on a count of antenna sectors of the antenna, which are beamformed to communicate with one or more wireless stations.

Example 38 includes the subject matter of any one of Examples 32-37, and optionally, wherein the antenna allocation is to allocate an antenna of the plurality of antennas to a PHY component of the plurality of PHY components based at least on a count of wireless stations to be communicated via the antenna.

Example 39 includes the subject matter of any one of Examples 32-38, and optionally, wherein the antenna allocation is to allocate an antenna of the plurality of antennas to a PHY component of the plurality of PHY components based at least on a traffic load of traffic to be communicated via the antenna.

Example 40 includes the subject matter of any one of Examples 32-39, and optionally, wherein the antenna allocation is to allocate an antenna of the plurality of antennas to a PHY component of the plurality of PHY components based at least on a Quality of Service (QoS) criterion to communicate with one or more wireless stations via the antenna.

Example 41 includes the subject matter of Example 40, and optionally, wherein the QoS criterion comprises at least a delay constraint to communicate with the one or more wireless stations via the antenna.

Example 42 includes the subject matter of any one of Examples 32-41, and optionally, comprising updating the antenna allocation based at least on a beamforming procedure between the wireless station and at least one other wireless station.

Example 43 includes the subject matter of any one of Examples 32-42, and optionally, comprising controlling a switch component of the plurality of switch components to switch a connection of a respective PHY component of the plurality of PHY components from at least one first antenna of the plurality of antennas to at least one second antenna of the plurality of antennas.

Example 44 includes the subject matter of any one of Examples 32-43, and optionally, wherein a switch component of the plurality of switch components is able to connect a respective PHY component of the plurality of PHY components to any antenna of the plurality of antennas.

Example 45 includes the subject matter of any one of Examples 32-44, and optionally, wherein a count of the plurality of PHY components is less than a count of the plurality of antennas.

Example 46 includes the subject matter of any one of Examples 32-45, and optionally, wherein the wireless station comprises an Access Point (AP).

Example 47 includes a product including one or more tangible computer-readable non-transitory storage media comprising computer-executable instructions operable to, when executed by at least one computer processor, enable the at least one computer processor to implement operations at a wireless station, the operations comprising operating a plurality of Physical layer (PHY) components to communicate over a directional frequency band; operating a plurality of lower Medium Access Control (MAC) components to control channel access of the plurality of PHY components; determining an antenna allocation of a plurality of antennas to the plurality of PHY components; and controlling a plurality of switch components to connect between respective PHY components of the plurality of PHY components and the plurality of antennas according to the antenna allocation.

Example 48 includes the subject matter of Example 47, and optionally, wherein the antenna allocation is to allocate no more than one PHY component per antenna.

Example 49 includes the subject matter of Example 47 or 48, and optionally, wherein the antenna allocation is to allocate two or more antennas of the plurality of antennas to a same PHY component.

Example 50 includes the subject matter of any one of Examples 47-49, and optionally, wherein the antenna allocation is to allocate a first count of one or more first antennas of the plurality of antennas to a first PHY component of the plurality of PHY components, and a second count of one or more second antennas of the plurality of antennas to a second PHY component of the plurality of PHY components, the second count is different from the first count.

Example 51 includes the subject matter of any one of Examples 47-50, and optionally, wherein the antenna allocation is to allocate an antenna of the plurality of antennas to a PHY component of the plurality of PHY components based at least on a direction covered by the antenna.

Example 52 includes the subject matter of any one of Examples 47-51, and optionally, wherein the antenna allocation is to allocate an antenna of the plurality of antennas to a PHY component of the plurality of PHY components based at least on a count of antenna sectors of the antenna, which are beamformed to communicate with one or more wireless stations.

Example 53 includes the subject matter of any one of Examples 47-52, and optionally, wherein the antenna allocation is to allocate an antenna of the plurality of antennas to a PHY component of the plurality of PHY components based at least on a count of wireless stations to be communicated via the antenna.

Example 54 includes the subject matter of any one of Examples 47-53, and optionally, wherein the antenna allocation is to allocate an antenna of the plurality of antennas to a PHY component of the plurality of PHY components based at least on a traffic load of traffic to be communicated via the antenna.

Example 55 includes the subject matter of any one of Examples 47-54, and optionally, wherein the antenna allocation is to allocate an antenna of the plurality of antennas to a PHY component of the plurality of PHY components based at least on a Quality of Service (QoS) criterion to communicate with one or more wireless stations via the antenna.

Example 56 includes the subject matter of Example 55, and optionally, wherein the QoS criterion comprises at least a delay constraint to communicate with the one or more wireless stations via the antenna.

Example 57 includes the subject matter of any one of Examples 47-56, and optionally, wherein the operations comprise updating the antenna allocation based at least on a beamforming procedure between the wireless station and at least one other wireless station.

Example 58 includes the subject matter of any one of Examples 47-57, and optionally, wherein the operations comprise controlling a switch component of the plurality of switch components to switch a connection of a respective PHY component of the plurality of PHY components from at least one first antenna of the plurality of antennas to at least one second antenna of the plurality of antennas.

Example 59 includes the subject matter of any one of Examples 47-58, and optionally, wherein a switch component of the plurality of switch components is able to connect a respective PHY component of the plurality of PHY components to any antenna of the plurality of antennas.

Example 60 includes the subject matter of any one of Examples 47-59, and optionally, wherein a count of the plurality of PHY components is less than a count of the plurality of antennas.

Example 61 includes the subject matter of any one of Examples 47-60, and optionally, wherein the wireless station comprises an Access Point (AP).

Example 62 includes an apparatus of wireless communication by a wireless station, the apparatus comprising means for operating a plurality of Physical layer (PHY) components to communicate over a directional frequency band; means for operating a plurality of lower Medium Access Control (MAC) components to control channel access of the plurality of PHY components; means for determining an antenna allocation of a plurality of antennas to the plurality of PHY components; and means for controlling a plurality of switch components to connect between respective PHY components of the plurality of PHY components and the plurality of antennas according to the antenna allocation.

Example 63 includes the subject matter of Example 62, and optionally, wherein the antenna allocation is to allocate no more than one PHY component per antenna.

Example 64 includes the subject matter of Example 62 or 63, and optionally, wherein the antenna allocation is to allocate two or more antennas of the plurality of antennas to a same PHY component.

Example 65 includes the subject matter of any one of Examples 62-64, and optionally, wherein the antenna allocation is to allocate a first count of one or more first antennas of the plurality of antennas to a first PHY component of the plurality of PHY components, and a second count of one or more second antennas of the plurality of antennas to a second PHY component of the plurality of PHY components, the second count is different from the first count.

Example 66 includes the subject matter of any one of Examples 62-65, and optionally, wherein the antenna allocation is to allocate an antenna of the plurality of antennas to a PHY component of the plurality of PHY components based at least on a direction covered by the antenna.

Example 67 includes the subject matter of any one of Examples 62-66, and optionally, wherein the antenna allocation is to allocate an antenna of the plurality of antennas to a PHY component of the plurality of PHY components based at least on a count of antenna sectors of the antenna, which are beamformed to communicate with one or more wireless stations.

Example 68 includes the subject matter of any one of Examples 62-67, and optionally, wherein the antenna allocation is to allocate an antenna of the plurality of antennas to a PHY component of the plurality of PHY components based at least on a count of wireless stations to be communicated via the antenna.

Example 69 includes the subject matter of any one of Examples 62-68, and optionally, wherein the antenna allocation is to allocate an antenna of the plurality of antennas to a PHY component of the plurality of PHY components based at least on a traffic load of traffic to be communicated via the antenna.

Example 70 includes the subject matter of any one of Examples 62-69, and optionally, wherein the antenna allocation is to allocate an antenna of the plurality of antennas to a PHY component of the plurality of PHY components based at least on a Quality of Service (QoS) criterion to communicate with one or more wireless stations via the antenna.

Example 71 includes the subject matter of Example 70, and optionally, wherein the QoS criterion comprises at least a delay constraint to communicate with the one or more wireless stations via the antenna.

Example 72 includes the subject matter of any one of Examples 62-71, and optionally, comprising means for updating the antenna allocation based at least on a beamforming procedure between the wireless station and at least one other wireless station.

Example 73 includes the subject matter of any one of Examples 62-72, and optionally, comprising means for controlling a switch component of the plurality of switch components to switch a connection of a respective PHY component of the plurality of PHY components from at least one first antenna of the plurality of antennas to at least one second antenna of the plurality of antennas.

Example 74 includes the subject matter of any one of Examples 62-73, and optionally, wherein a switch component of the plurality of switch components is able to connect a respective PHY component of the plurality of PHY components to any antenna of the plurality of antennas.

Example 75 includes the subject matter of any one of Examples 62-74, and optionally, wherein a count of the plurality of PHY components is less than a count of the plurality of antennas.

Example 76 includes the subject matter of any one of Examples 62-75, and optionally, wherein the wireless station comprises an Access Point (AP).

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
a plurality of Physical layers (PHYs) comprising circuitry to process communication of a wireless station over a directional frequency band;
a plurality of lower Medium Access Controllers (MACs) to control channel access of said plurality of PHYs;
a plurality of switches configured to connect between respective PHYs of the plurality of PHYs and a plurality of antennas of said wireless station, a switch of the plurality of switches configured to switch a connection of a respective PHY of the plurality of PHYs from at least one first antenna of the plurality of antennas to at least one second antenna of the plurality of antennas; and
an upper MAC configured to dynamically control the plurality of switches to dynamically allocate the plurality of antennas to the plurality of PHYs, the upper MAC configured to dynamically allocate the plurality of antennas to the plurality of PHYs by determining a count of antennas to be allocated to a particular PHY based at least on a traffic load to be communicated via the antennas to be allocated to the particular PHY, the upper MAC to determine a first antenna allocation of the plurality of antennas to the plurality of PHYs, to control said plurality of switches to connect said plurality of PHYs to said plurality of antennas according to said first antenna allocation, to determine a second antenna allocation of the plurality of antennas to the plurality of PHYs, the second antenna allocation different from the first antenna allocation, and to control said plurality of switches to connect said plurality of PHYs to said plurality of antennas according to said second antenna allocation.

2. The apparatus of claim 1, wherein the first antenna allocation is to allocate no more than one PHY per antenna.

3. The apparatus of claim 1, wherein the first antenna allocation is to allocate two or more antennas of the plurality of antennas to a same PHY.

4. The apparatus of claim 1, wherein the first antenna allocation is to allocate a first count of one or more first antennas of the plurality of antennas to a first PHY of the plurality of PHYs, and a second count of one or more second antennas of the plurality of antennas to a second PHY of the plurality of PHYs, the second count is different from the first count, and wherein the second antenna allocation is to switch an allocation of at least one of the one or more first antennas from the first PHY to the second PHY.

5. The apparatus of claim 1, wherein the first antenna allocation is to allocate the first antenna to the PHY based at least on a direction covered by the first antenna.

6. The apparatus of claim 1, wherein the first antenna allocation is to allocate the first antenna to the PHY based at least on a count of antenna sectors of the first antenna, which are beamformed to communicate with one or more wireless stations.

7. The apparatus of claim 1, wherein the first antenna allocation is to allocate the first antenna to the PHY based at least on a count of wireless stations to be communicated via the first antenna.

8. The apparatus of claim 1, wherein the first antenna allocation is to allocate a first count of one or more first antennas of the plurality of antennas to a first PHY of the plurality of PHYs, and a second count of one or more second antennas of the plurality of antennas to a second PHY of the plurality of PHYs, the second count is greater than the first count, and wherein a traffic load to be communicated via an antenna of the one or more first antennas is greater than a traffic load to be communicated via an antenna of the one or more second antennas.

9. The apparatus of claim 1, wherein the first antenna allocation is to allocate the first antenna to the PHY based at least on a Quality of Service (QoS) criterion to communicate with one or more wireless stations via the first antenna.

10. The apparatus of claim 9, wherein the QoS criterion comprises at least a delay constraint to communicate with the one or more wireless stations via the first antenna.

11. The apparatus of claim 1, wherein the upper MAC is configured to update the first antenna allocation based at least on a beamforming procedure between said wireless station and at least one other wireless station.

12. The apparatus of claim 1, wherein the first antenna allocation comprises a connection of the PHY with the first antenna, and the second antenna allocation comprises a connection of the PHY with the second antenna.

13. The apparatus of claim 1, wherein the switch is able to connect the PHY to any antenna of the plurality of antennas.

14. The apparatus of claim 1, wherein a count of the plurality of PHYs is less than a count of the plurality of antennas.

15. The apparatus of claim 1, wherein the wireless station comprises an Access Point (AP).

16. The apparatus of claim 1 comprising a memory and a processor.

17. A system of wireless communication comprising a wireless station, the wireless station comprising:
- a plurality of antennas;
- a memory;
- a processor;
- a plurality of Physical layers (PHYs) comprising circuitry to process communication over a directional frequency band;
- a plurality of lower Medium Access Controllers (MACs) to control channel access of said plurality of PHYs;
- a plurality of switches configured to connect between respective PHYs of the plurality of PHYs and the plurality of antennas, a switch of the plurality of switches configured to switch a connection of a respective PHY of the plurality of PHYs from at least one first antenna of the plurality of antennas to at least one second antenna of the plurality of antennas; and
- an upper MAC configured to dynamically control the plurality of switches to dynamically allocate the plurality of antennas to the plurality of PHYs, the upper MAC configured to dynamically allocate the plurality of antennas to the plurality of PHYs by determining a count of antennas to be allocated to a particular PHY based at least on a traffic load to be communicated via the antennas to be allocated to the particular PHY, the upper MAC to determine a first antenna allocation of the plurality of antennas to the plurality of PHYs, to control said plurality of switches to connect said plurality of PHYs to said plurality of antennas according to said first antenna allocation, to determine a second antenna allocation of the plurality of antennas to the plurality of PHYs, the second antenna allocation different from the first antenna allocation, and to control said plurality of switches to connect said plurality of PHYs to said plurality of antennas according to said second antenna allocation.

18. The system of claim 17, wherein the first antenna allocation is to allocate two or more antennas of the plurality of antennas to a same PHY.

19. A method to be performed at a wireless station, the method comprising:
- operating a plurality of Physical layers (PHYs) to communicate over a directional frequency band;
- operating a plurality of lower Medium Access Controllers (MACs) to control channel access of said plurality of PHYs; and
- dynamically controlling a plurality of switches to dynamically allocate a plurality of antennas to the plurality of PHYs by determining a count of antennas to be allocated to a particular PHY based at least on a traffic load to be communicated via the antennas to be allocated to the particular PHY, herein dynamically controlling the plurality of switches comprises:
  - determining a first antenna allocation of the plurality of antennas to the plurality of PHYs;
  - controlling the plurality of switches to connect between respective PHYs of the plurality of PHYs and the plurality of antennas according to said first antenna allocation;
  - determining a second antenna allocation of the plurality of antennas to the plurality of PHYs, the second antenna allocation different from the first antenna allocation; and
  - controlling said plurality of switches to connect said plurality of PHYs to said plurality of antennas according to said second antenna allocation.

20. The method of claim 19, wherein the first antenna allocation is to allocate a first count of one or more first antennas of the plurality of antennas to a first PHY of the plurality of PHYs, and a second count of one or more second antennas of the plurality of antennas to a second PHY of the plurality of PHYs, the second count is different from the first count.

21. A product including one or more tangible computer-readable non-transitory storage media comprising computer-executable instructions operable to, when executed by at least one processor, enable the at least one processor to cause a wireless station to:
- operate a plurality of Physical layers (PHYs) to communicate over a directional frequency band;
- operate a plurality of lower Medium Access Controllers (MACs) to control channel access of said plurality of PHYs; and
- dynamically control a plurality of switches to dynamically allocate a plurality of antennas to the plurality of PHYs by determining a count of antennas to be allocated to a, particular PHY based at least on a traffic load to be communicated via the antennas to be allocated to the particular PHY, wherein, the instructions, when executed, result in dynamically controlling the plurality of switches by:
  - determining a first antenna allocation of the plurality of antennas to the plurality of PHYs;
  - controlling the plurality of switches to connect between respective PHYs of the plurality of PHYs and the plurality of antennas according to said first antenna allocation;
  - determining a second antenna allocation of the plurality of antennas to the plurality of PHYs, the second antenna allocation different from the first antenna allocation; and
  - controlling said plurality of switches to connect said plurality of PHYs to said plurality of antennas according to said second antenna allocation.

22. The product of claim 21, wherein the first antenna allocation is to allocate no more than one PHY per antenna.

23. The product of claim 21, wherein the first antenna allocation is to allocate two or more antennas of the plurality of antennas to a same PHY.

24. The product of claim 21, wherein the first antenna allocation is to allocate a first count of one or more first antennas of the plurality of antennas to a first PHY of the plurality of PHYs, and a second count of one or more second antennas of the plurality of antennas to a second PHY of the plurality of PHYs, the second count is different from the first count.

25. The product of claim 21, wherein the instructions, when executed, cause the wireless station to update the first antenna allocation based at least on a beamforming procedure between said wireless station and at least one other wireless station.

* * * * *

UNITED STATES PATENT AND TRADEMARK OFFICE
CERTIFICATE OF CORRECTION

PATENT NO. : 10,524,136 B2
APPLICATION NO. : 15/279010
DATED : December 31, 2019
INVENTOR(S) : Ou Yang et al.

Page 1 of 1

It is certified that error appears in the above-identified patent and that said Letters Patent is hereby corrected as shown below:

In the Claims

In Column 31, Line 56, in Claim 19, delete "the particular PHY, herein" and insert -- the particular PHY, wherein --, therefor.

In Column 32, Line 27, in Claim 21, delete "to be allocated to a, particular" and insert -- to be allocated to a particular --, therefor.

Signed and Sealed this
Tenth Day of March, 2020

Andrei Iancu
*Director of the United States Patent and Trademark Office*